Jan. 27, 1959  W. A. HILDRETH  2,870,855
HOLD-DOWN DEVICE FOR STORAGE BATTERIES
Filed Feb. 25, 1957
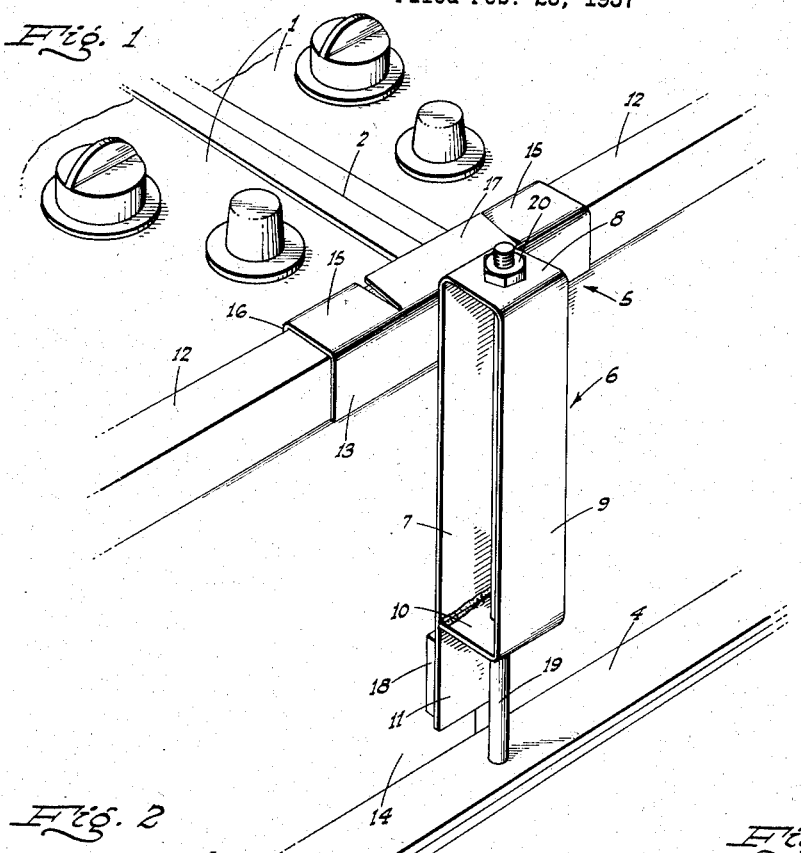
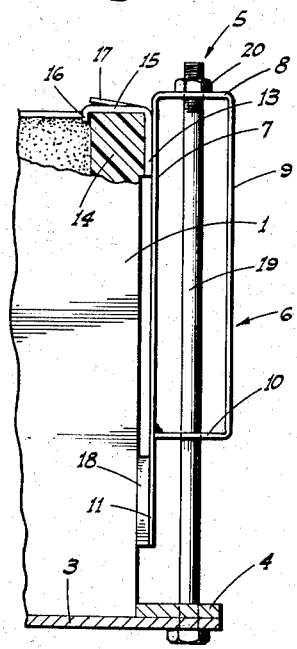
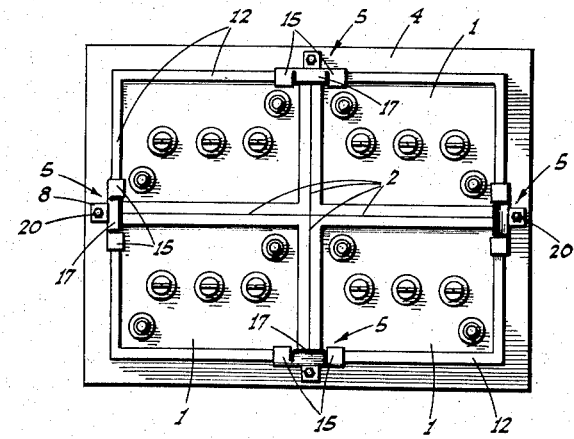
INVENTOR.
Wilmarth A. Hildreth
BY Webster & Webster
ATTORNEYS

United States Patent Office 2,870,855
Patented Jan. 27, 1959

2,870,855
HOLD-DOWN DEVICE FOR STORAGE BATTERIES

Wilmarth A. Hildreth, Stockton, Calif., assignor of one-half to Myrna D. Hildreth, Stockton, Calif.

Application February 25, 1957, Serial No. 642,295

2 Claims. (Cl. 180—68.5)

The present invention relates to, and it is a major object to provide, a novel device adapted to engage and hold down storage batteries on a supporting base or the like; the device being especially designed—but not limited—for use with storage batteries on motor vehicles, particularly trucks.

On trucks a plurality of storage batteries are commonly carried in a symmetrical bank or rectangular group wherein the batteries all abut each other and are engaged at the top outer edges by a continuous, rectangular, hold-down frame maintained in position by a number of vertical tension bolts. With such an arrangement all of the tension bolts must be released and the entire frame detached before any one of the batteries can be removed and replaced. Also, it usually requires the disconnection of battery leads other than those which are coupled to such one battery.

It is therefore another important object of this invention to provide a battery hold-down device which—when used in multiple, as will hereinafter appear—eliminates the need of the continuous frame, and permits removal and replacement of any one battery of the bank or group readily and quickly, and without disturbing the other batteries or disconnecting the leads which are coupled thereto.

It is recognized that when storage batteries are running hot—i. e., receiving a substantial charge from the generator—they tend to expand, and it is an additional object of this invention to provide a battery hold-down device which permits of greater battery expansion than does the continuous frame type of hold-down.

A further object of the invention is to provide a battery hold-down device which is less subject to corrosion, and which is accomplished by having a lesser portion of the top outer edges of each battery covered.

It is also an object of the invention to provide a battery hold-down device which is designed for ease and economy of manufacture and installation.

Still another object of the invention is to provide a practical, reliable, and durable hold-down device for storage batteries, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of one of the hold-down devices as in use.

Fig. 2 is a side elevation of the same; the supporting base being in section, and the battery partly in section.

Fig. 3 is a top plan view of a symmetrical bank or rectangular group of storage batteries held down by devices embodying the present invention.

Referring now more particularly to the drawings, and to the characters of reference marked thereon, the hold-down device is especially adapted for use with a symmetrical bank or rectangular group of storage batteries 1 disposed—for example—as shown in Fig. 3, and wherein the lines of abutment between such batteries are indicated at 2.

The batteries 1 are supported on a base 3 and are held against lateral displacement by suitable means, such as a border frame 4.

In the present example—as in Fig. 3—four of the hold-down devices are shown in the positions occupied thereby; each being indicated generally at 5, spanning between adjacent batteries at the outer side thereof, intersecting the corresponding line of abutment, and effectively engaging the top outer edges of said batteries in hold-down relation.

As each of the hold-down devices 5 are identical in structure, a description of one will suffice.

As shown in Figs. 1 and 2, each hold-down device comprises an open upstanding post, indicated generally at 6, which post is formed from a single length of heavy-duty metallic strap bent to define a vertical inner side 7, a horizontal top 8, a vertical outer side 9, and a horizontal bottom 10. The bottom 10 is turned in so that it abuts—and is welded to—the inner side 7 a distance above its lower end, whereby to define a downwardly projecting skirt 11 on said inner side 7.

The post 6 is disposed so that its top 8 is slightly above the top outer edges 12 of the related batteries 1, while the bottom 10 of the post 6 and the skirt 11 are spaced above the base 3 and border frame 4.

Adjacent the top 8 the post is fitted—in rigid relation—with a horizontal, laterally facing cross plate 13 which lies flush against the walls 14 of said batteries 1 immediately adjacent the top outer edges 12.

At the end portions thereof the cross plate 3 includes, at the upper edge, and in integral relation, horizontal, inwardly projecting flanges 15 which seat on said top outer edges 12 of the batteries. The flanges 15 are the same width as the edges 12, and include—at their inner or free extremities—down-turned lips 16 which engage behind said top outer edges 12 in hook-like fashion.

Between the flanges 15 the cross plate 13 also includes an integral intermediate flange 17 separated at the ends from said flanges 15 and disposed at a slight upward and inward incline. The intermediate flange 17 adds strength to the cross plate 13, but because of its end separation from the flanges 15 and the described inclination, does not abut the upper edges of the batteries sufficient to prevent proper and full seating of such flanges 15.

The depending skirt 11 of the inner side 7 is fitted, on the inside face, with a stand-off pad 18 which bears against the adjacent walls 14 in spanning relation to the line of abutment between such batteries; such stand-off pad 18 maintaining the post 6 true to vertical.

A tension bolt 19 passes upwardly through the base 3 and border frame 4 from below, and thence extends through the post 6 in a central position, i. e., through openings formed centrally in the top 8 and bottom 10. A nut 20 is threaded on—and bears forcefully against—the top 8. When such nut 20 is tightened, forcing the post 6, cross plate 13, and flanges 15 downwardly, the engaged batteries 1 are effectively held down or clamped against the base 3.

When it is desired to remove and replace one of the batteries 1 the leads to only such battery are disconnected and then the two related hold-down devices 5 are released, which permits the operation to be carried out without disturbing the remaining batteries, or the leads connected thereto.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A hold-down device, for use with a storage battery supported on a base, comprising a post adapted to upstand closely adjacent a wall of the battery, a member on the post adapted to engage the top edge of said wall, a vertical tension bolt connected to the base and extending through the post to a termination above the top thereof, and a nut threaded on the bolt above the post and forcefully bearing against said top; the post being formed from a single length of metallic strap bent to include, with the top, an inner side, an outer side, and a bottom; the inner side depending, as a skirt, below the bottom; and a stand-off pad on the inside of said skirt.

2. In combination with abutted storage batteries supported on a base and having aligned walls at right angles to the line of abutment, a hold-down device comprising a post upstanding closely adjacent said walls of the batteries and the line of abutment, a vertical bolt connected to the base and to the post, a cross plate on the post engaging said walls adjacent the top edges thereof and crossing the line of abutment, and spaced-apart hook flanges on the end portions of the cross plate engaging the top edges of the walls.

References Cited in the file of this patent

UNITED STATES PATENTS

| | | |
|---|---|---|
| 193,479 | Burgin | July 24, 1877 |
| 1,636,562 | Hick | July 19, 1927 |
| 1,994,451 | Christenson | Mar. 12, 1935 |
| 2,326,481 | Meyer | Aug. 10, 1943 |
| 2,384,112 | Meyer | Sept. 4, 1945 |